Jan. 21, 1969    L. W. GATES ET AL    3,422,953
REAR CROSS-CONVEYOR ASSEMBLY FOR HARVESTER
Filed June 21, 1967
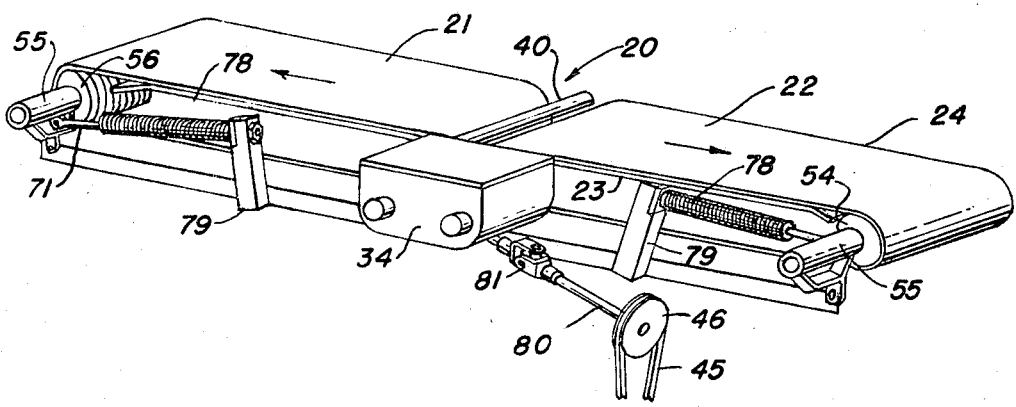
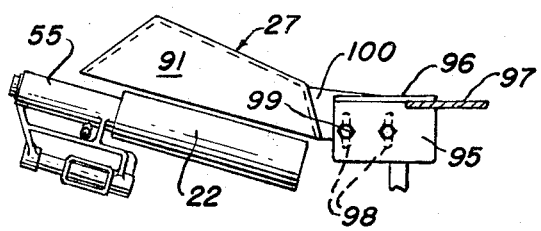
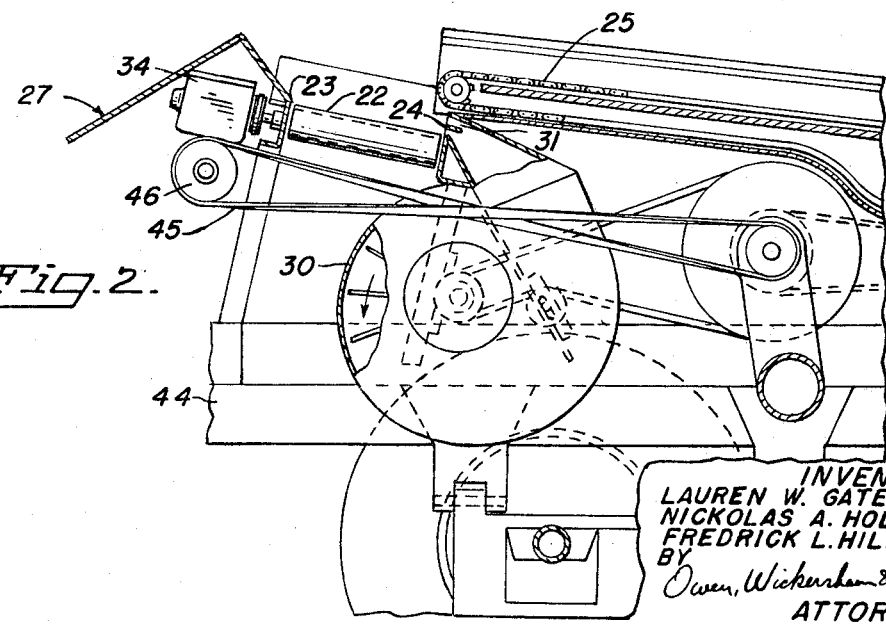
INVENTORS
LAUREN W. GATES
NICKOLAS A. HOLTZ
FREDRICK L. HILL
BY Owen, Wickersham & Erickson
ATTORNEYS

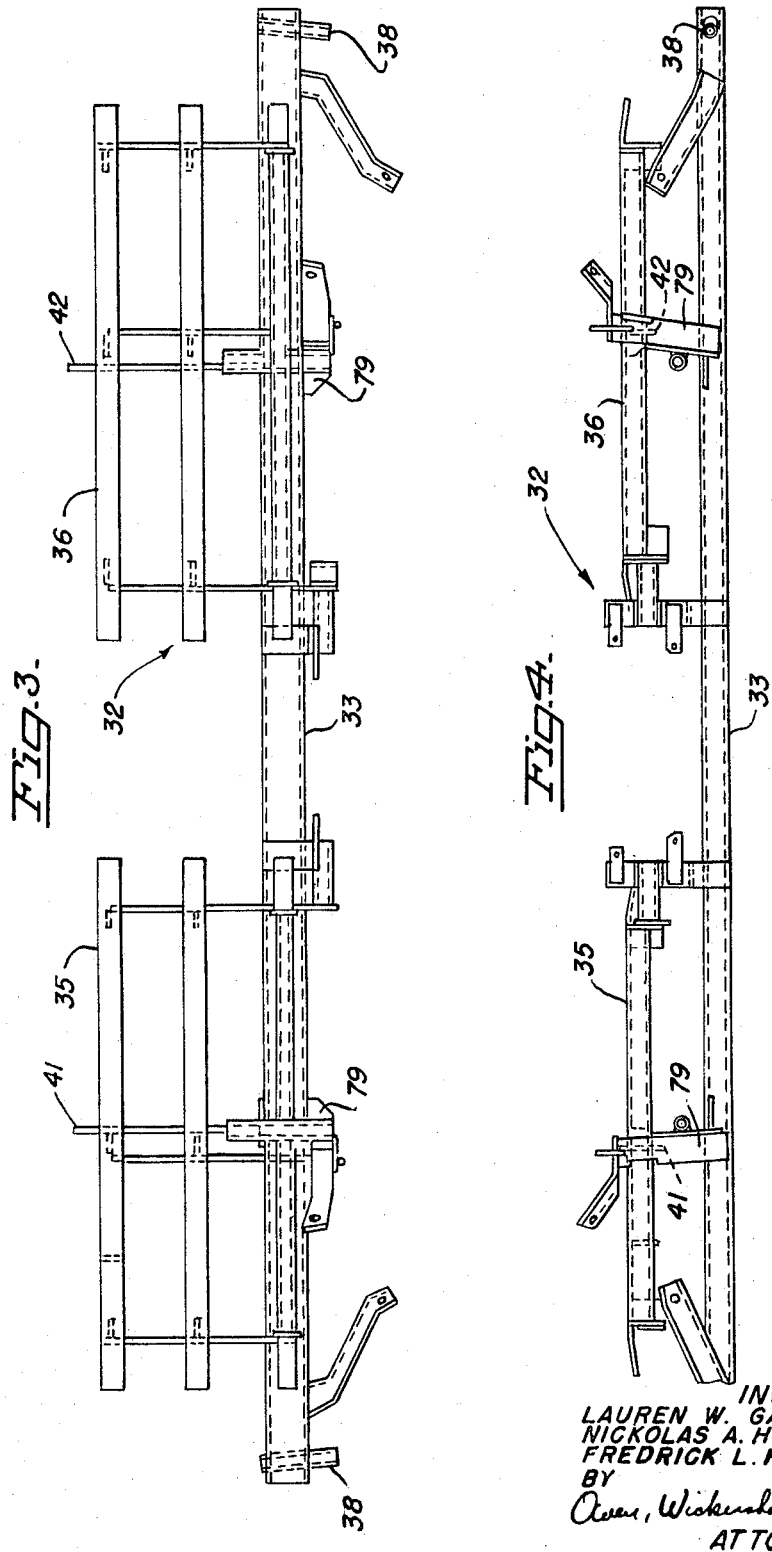

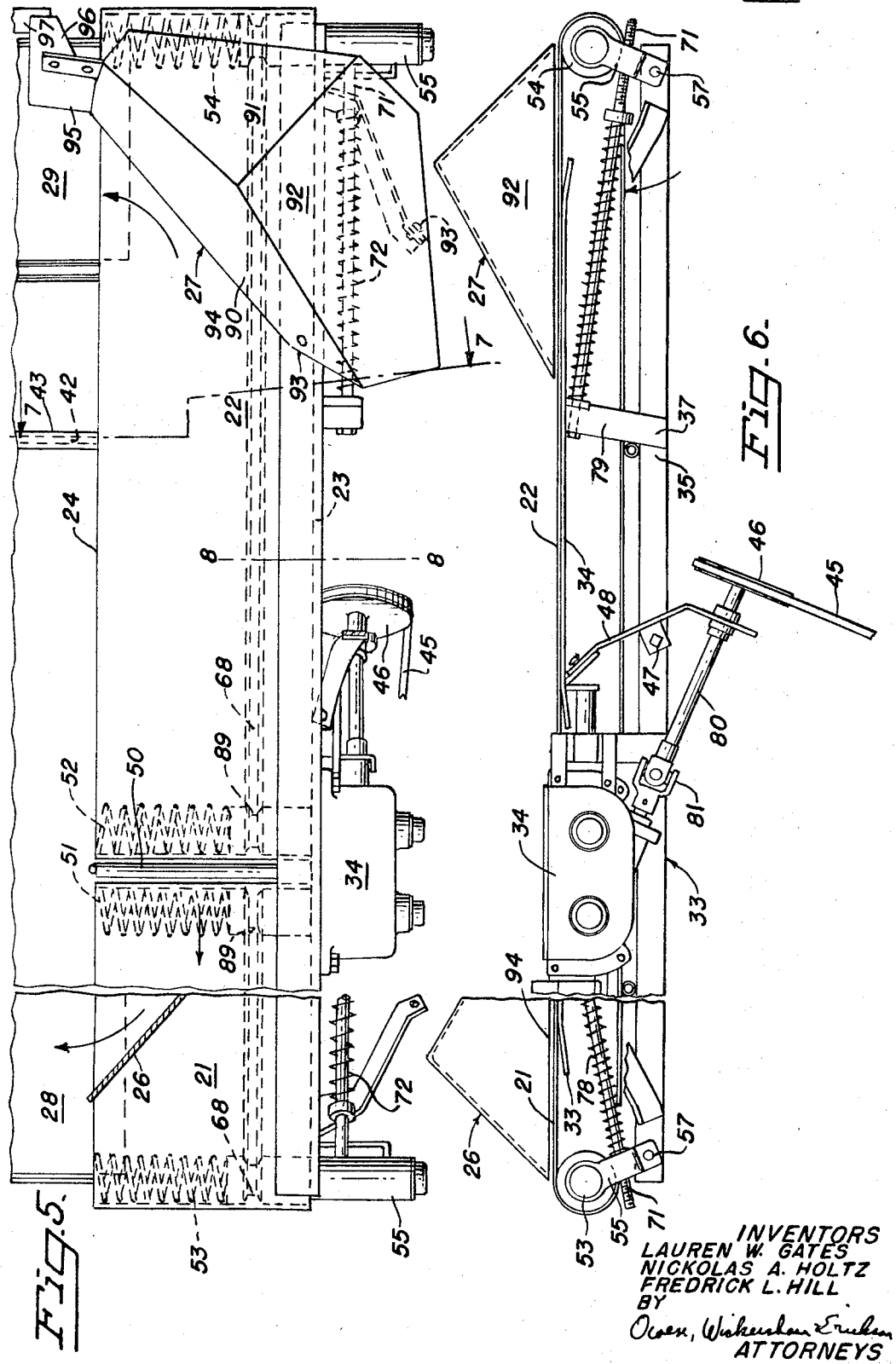

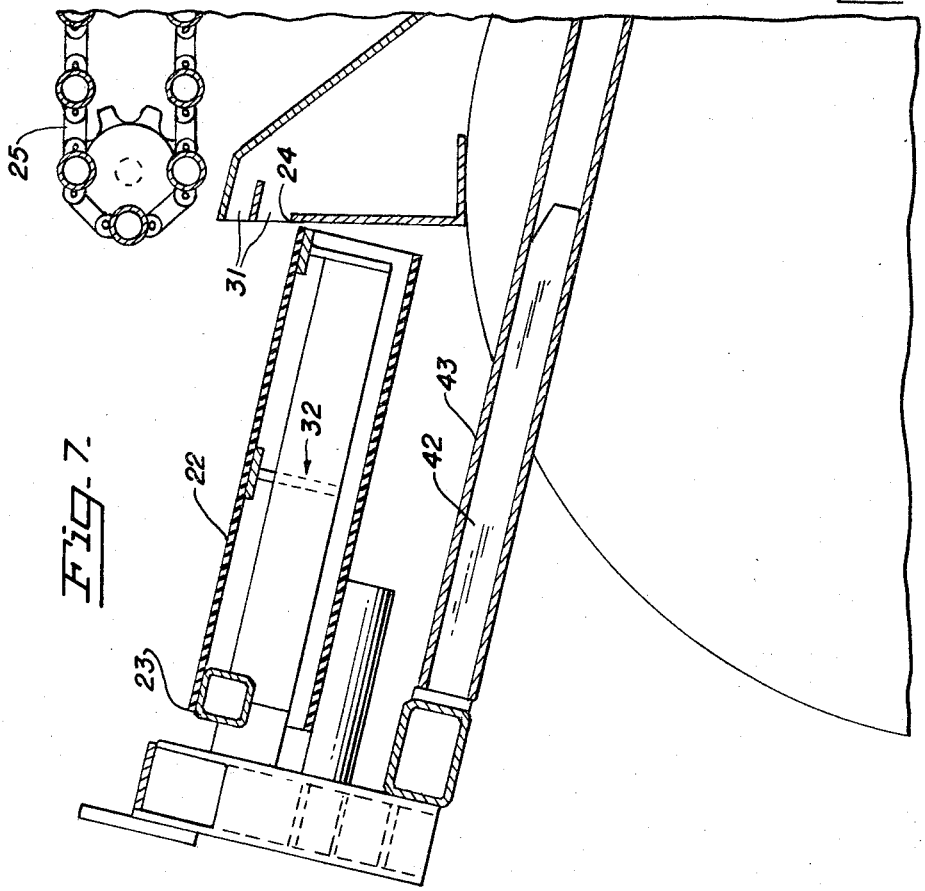
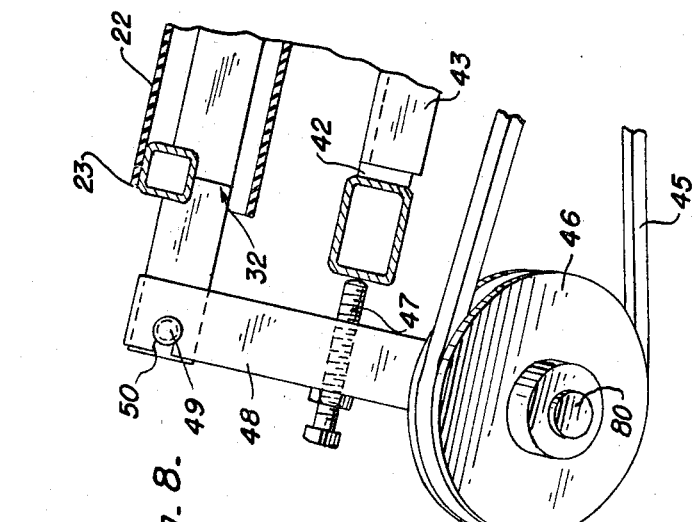

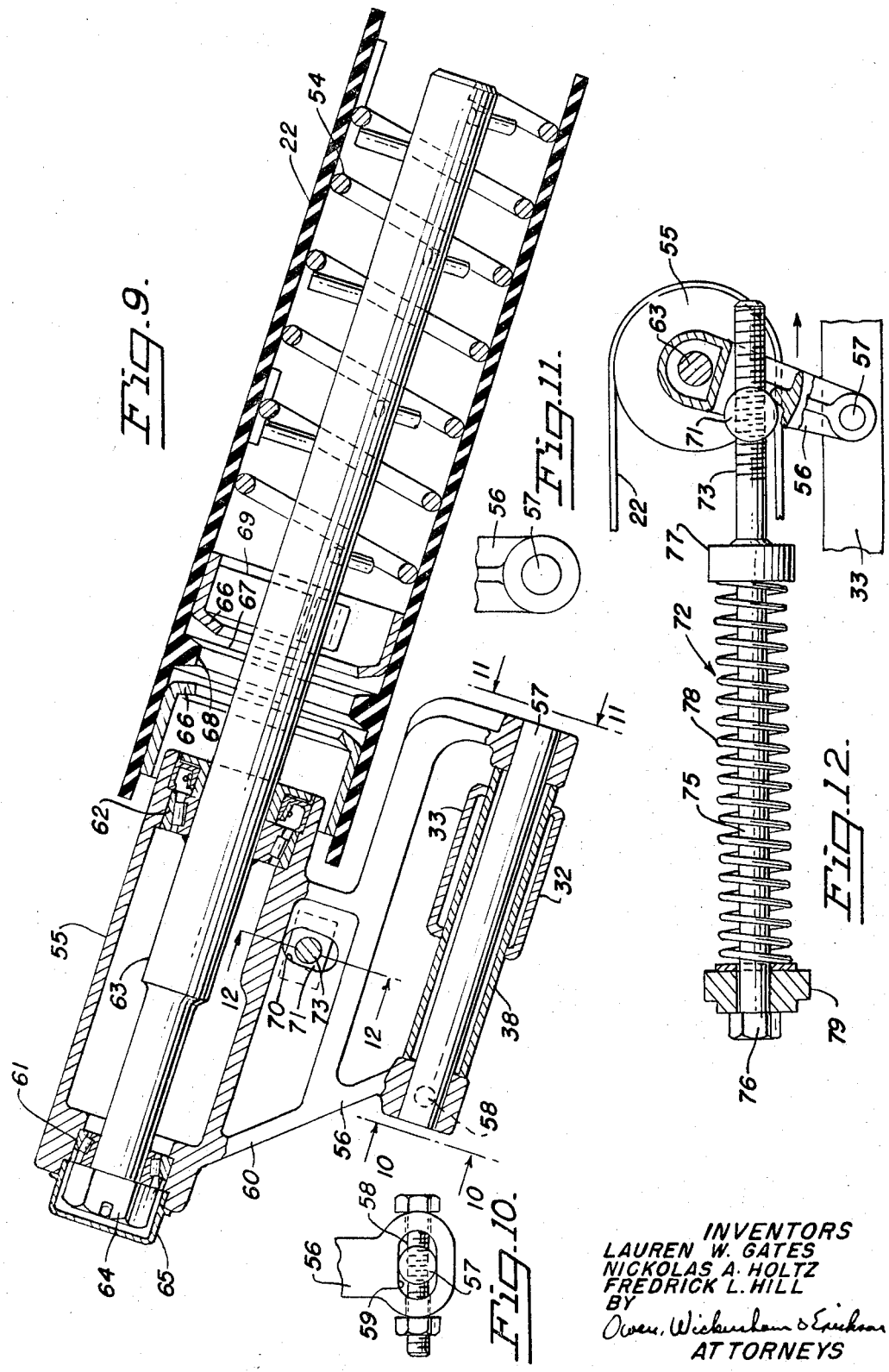

INVENTORS
LAUREN W. GATES
NICKOLAS A. HOLTZ
FREDRICK L. HILL
BY
ATTORNEYS

United States Patent Office 3,422,953
Patented Jan. 21, 1969

3,422,953
REAR CROSS-CONVEYOR ASSEMBLY
FOR HARVESTER
Lauren W. Gates, Rio Vista, Nickolas A. Holtz, Sacramento, and Fredrick L. Hill, Rio Vista, Calif., assignors to The Regents of the University of California, Berkeley, Calif.
Filed June 21, 1967, Ser. No. 647,756
U.S. Cl. 209—74       9 Claims
Int. Cl. B07b *3/08;* A01g *19/00;* B65g *15/62*

ABSTRACT OF THE DISCLOSURE

A rear cross-conveyor assembly for a harvester has a pair of forwardly extending bars engageable in sockets in the harvester frame as the sole support for said cross-conveyor assembly. A transmission supported centrally by said conveyor frame has pulley means engageable with a drive belt to provide the only other connection. A pair of inboard belt-supporting pulleys are supported on fixed axes adjacent the transmission means, and bearing means pivotally supported at each end of the conveyor frame have a rotatable idling shaft. The conveyor belts, each looped about one inboard pulley and one outboard pulley tend to swing the outboard pulley and its bearing means inwardly toward the inboard pulleys, and a spring cartridge between each bearing means and the frame tends to swing the bearing means outwardly to exert tension on the belt.

---

This invention relates to an improved belt conveyor assembly wherein a constant tension is maintained on the conveyor belt. More particularly, it relates to an improved assembly having, in a single conveyor unit, two belts that move in opposite directions from a common center to send two streams of traffic in directly opposite directions, as do the rear cross-conveyors of tomato harvesters and the like. There, the conveyors, while generally horizontal, are tilted so that one side is higher than the other side.

In the mechanical harvesting of tomatoes and some other crops the fruit separated from the vine is carried by a collecting conveyor up and toward the rear of the harvester and deposited on a rear cross-conveyor, typically a pair of cross-conveyor belts, which transport the separated fruit out to the sides of the machine and transfer it to forwardly moving sorting conveyors. The present invention solves a number of problems relating to such a rear cross-conveyor.

At the time of separation of the fruit from the vine, some leaves and other light trash are usually deposited on the collecting conveyor along with the fruit; since it is desired to separate the fruit from the leaves and trash, the better such systems employ a blower to send a strong current of air across the fruit at the point where it is transferred from the collecting conveyor to the rear cross-conveyor, as covered in U.S. Patent No. 3,333,198 (Ser. No. 530,628, filed Feb. 28, 1966). If the rear cross-conveyor belts were completely horizontal, this forceful airstream would tend to blow the fruit off the rear edge instead of merely conveying away the light trash; so it is desirable to have the forward edge of the conveyor belts higher than their rear edge, so that while the leaves are blown away, the tomatoes are merely forced to roll somewhat upwardly to approximately the center of the belts. The moving path of the belts is substantially horizontal except for this tilt. Such a tilt creates problems in proper belt training which are solved by this invention.

While two oppositely moving cross-conveyors are used, it is desirable to unite them in a single assembly, and this is accomplished by the present invention, which, moreover, enables installation and removal of the assembly on the harvester frame in a matter of minutes in an ingenious but simple manner. The invention also drives both belts from a single gear box located where the two belts nearly touch, there being idling pulleys at the outboard ends of each belt.

A difficult problem in such conveyor systems is to obtain and retain the proper belt tension. Without such tension, the belts may slip if too loose, or they may be pulled apart if the tension exceeds the ultimate strength of the belts. The present invention both prevents slipping and such damage to the belt. In the present invention the inboard pulleys at the driving gear box are maintained in a constant position, and a means for training the conveyor belt around them is provided. The tension on the belts is then automatically maintained by means of a novel self-adjusting arrangement of the outboard pulleys, where the training is also simultaneously maintained positively. There is no need for frequent manual adjustment of the belts in order to assure the correct tension.

More specifically, in the present invention the outboard pulleys are supported entirely from one side and are cantilevered. Their bearing is provided by a bearing housing which is mounted to swing relative to the main frame of the rear cross-conveyor assembly. A spring system maintains the desired tension, tending to force the outboard pulleys outwardly, while each belt loop itself tends to pull its outboard pulley in toward the center. By balancing these forces, the correct tension is obtained, as will be explained in detail below.

Several other features are significant. At the ends of each rear cross-conveyor, transfer to the forwardly moving sorting conveyors is obtained by novel crowders that are readily adjusted to give maximum efficiency of fruit transfer while getting rid of granular dirt, small waste, and small clods. Adjustment of the crowders is simple and effective.

The entire rear cross-conveyor assembly is a unit that is held in place by gravity, without bolts, by a pair of prongs fitting in sockets, and the only other connection made is that of attaching a single drive belt to a pulley wheel.

Other objects and advantages of the invention will appear from the following description of a preferred form thereof.

In the drawings:

FIG. 1 is an isometric view of a rear cross-conveyor assembly embodying the principles of the invention, shown detached from the remainder of the conveyor system and with some parts removed for the sake of simplicity.

FIG. 2 is a fragmentary view in side elevation and in section of the rear portion of a tomato harvester including the cross-conveyor assembly of FIG. 1.

FIG. 3 is a top plan view of the rear cross-conveyor frame.

FIG. 4 is an end elevation view of the frame of FIG. 3.

FIG. 5 is a somewhat enlarged and more complete top plan fragmentary view of the rear cross-conveyor assembly of FIG. 1 and some adjacent parts, broken near the middle on one side to conserve space.

FIG. 6 is a view in rear elevation of the rear cross-conveyor assembly and related portions of FIG. 5, also broken near the middle to conserve space.

FIG. 7 is an enlarged view in section taken along the line 7—7 in FIG. 5.

FIG. 8 is an enlarged fragmentary view taken along the line 8—8 in FIG. 5.

FIG. 9 is an enlarged view in elevation and in section of one of the outboard pulley systems.

FIG. 10 is an end view looking at FIG. 9 along the arrows 10—10, some parts behind being omitted.

FIG. 11 is an end view looking at FIG. 9 along the arrows 11—11, some parts behind being omitted.

FIG. 12 is an enlarged view in section taken along the line 12—12 in FIG. 9.

FIG. 15 is a fragmentary end view, partly in section, of the rear cross-conveyor and crowder.

Figures 13, 14:
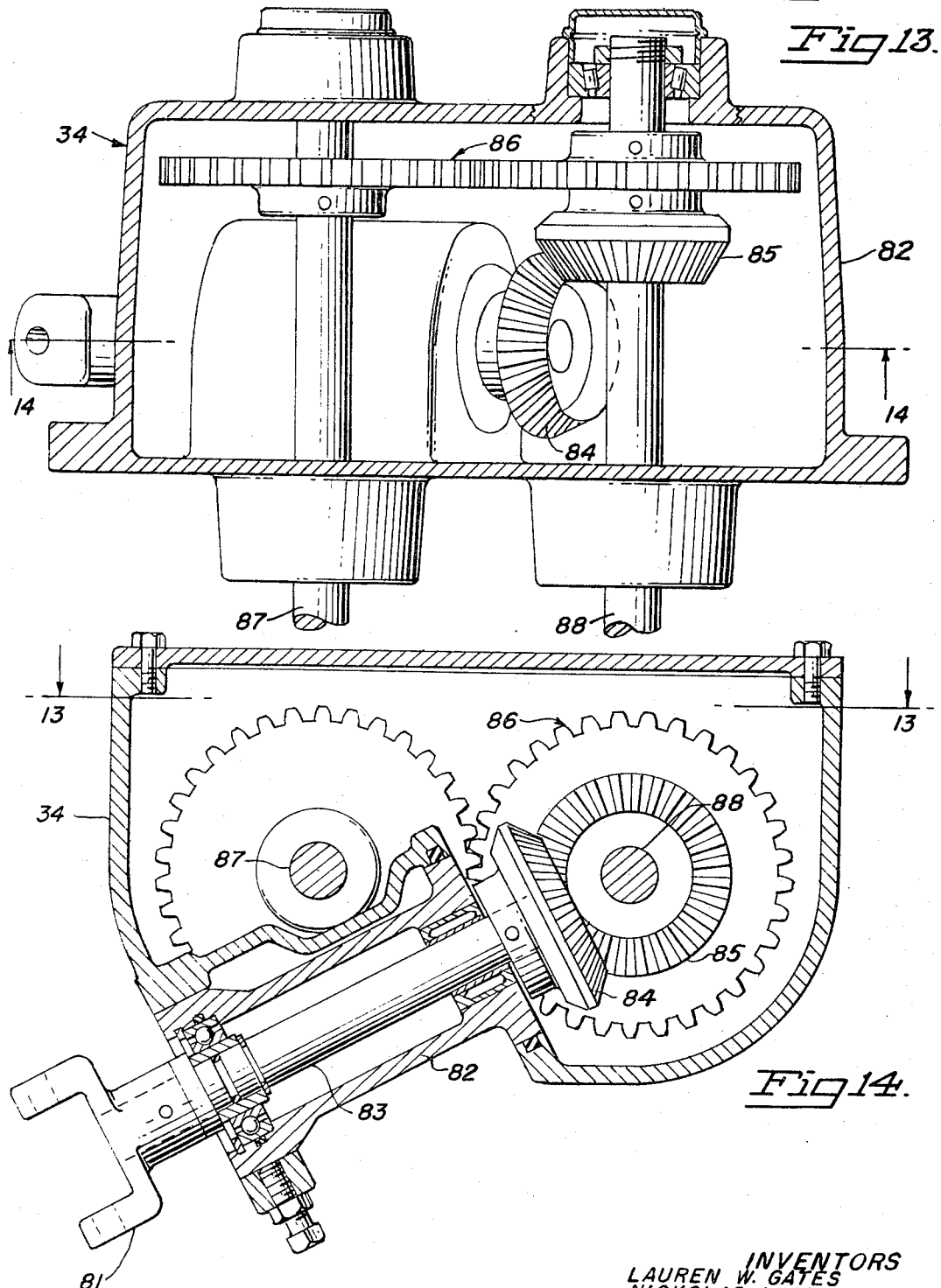
FIG. 13 is a view in horizontal section of the gear box system, taken along the line 13—13 in FIG. 14, with some parts broken away and shown in section.
FIG. 14 is a view in vertical section taken along the line 14—14 in FIG. 13, with some parts broken away and shown in section.

As shown in FIG. 1, the rear cross-conveyor assembly 20 comprises two conveyor belts 21 and 22 which move outwardly, away from each other. The belts 21 and 22 are supported, as shown in FIGS. 2 and 6, so that their rear edge 23 is higher than the front edge 24, but the conveyor pathway out from the center to the two sides is substantially horizontal. A collecting conveyor 25 deposits tomatoes or other fruit on the top reaches of the conveyor belts 21 and 22, and at their outer edges crowders 26 and 27 (FIGS. 5 and 6), preferably placed at approximately a 45 degree angle across the belts 21 and 22 crowd the fruit off the lower edge 24 on to sorter conveyor belts 28 and 29.

Blowers 30 (FIG. 2) have nozzle outlets 31 below the upper end of the collecting conveyor 25 and send streams of air across the belts 21 and 22, carrying leave, twigs, etc. away, while the uphill slant of the belts 21 and 22 prevents the tomatoes from being blown off.

A frame 32 (see FIGS. 3 and 4), which supports the cross-conveyors 21 and 22, is generally symmetric with respect to the fore-and-aft center line of the harvester, one side being a substantial duplicate of the other side. In the center portion a rear bar 33 (FIG. 3) supports a gear box 34 (see FIGS. 5, 6, 12, and 13). On each side of the gear box 34 is a conveyor belt framework 35, 36 (FIG. 3) of lengthwise extending and transverse members which support the upper reach of the conveyor belt 21, 22 to prevent it from unduly sagging. The rear bar 33, which may be a channel or a hollow rectangular tube, extends beyond the other frame members, and, adjacent its outboard end, the rear bar 33 is provided with a hollow bearing 38, which is supported at substantially the same angle as that at which the assembly itself is to be supported.

At the forward end of the frame 32, a pair of projecting bars 41, 42 extend transverse to the conveyor 20 and engage in sockets 43 in the main frame 44 of the harvester. Thereby, the bars 41 and 42 and the sockets 43 provide a very simple support for the assembly 20 by which it can easily be installed or taken out. Since the conveyor assembly 20 rests at an angle going down in to the machine (due to the fact that the sockets 43 are set at the angle), the conveyor assembly 20 holds itself in position by its own weight and by sole engagement of the bars 41 and 42 in the sockets 43. There is no need to provide bolts or any other retention means. Only a single drive belt 45, which is attached to a pulley 46, provides an additional connection. When the conveyor assembly 20 is to be taken off the harvester, it is simply lifted off, after removing the drive belt 45 from the pulley 46. An adjustment screw 47 (FIG. 8) enables adjustment of the tension of the driving belt 45. The screw 47 may be loosened or removed. The shaft 80 of the pulley 46 is supported by a bearing support bracket 48 that supports the screw 47, which bears against the frame 32, and that is pivoted to the frame 32 by a pivot member 49 that is engaged in a notch 50. The bracket 48 can be readily removed from the frame 32, by sliding the pivot member 49 out of the notch 50, to clear obstructions, then the unit 20 is removed from the harvester.

The gear box 34 in the center drives the belts 21 and 22 through a pair of inboard pulleys 51 and 52 (see FIG. 5), which rotate about a fixed axis, so that they are retained in their proper position at all times, all adjustments being made at a pair of idling outboard pulleys 53 and 54. In between the inboard pulleys 51 and 52 is a center device 40 that keeps the product from remaining in a trough between the belts 21 and 22, comprising a tube 40a mounted on an undersized shaft 40b.

Support for each outboard pulley 53 or 54 is provided by a swinging bearing housing 55 (FIG. 9). The bearing housing 55 has on its lower end a yoke-like structure 56 which bridges the frame member 32 and the bearing 38. After placing the yoke 56 in position, a pivot pin 57 is inserted inside the bearing 38 and then is locked to the bearing housing 55 by a bolt 58 in a slot 59 and then the bearing housing 55 is pivoted relative to the bearing 38 and therefore relative to the frame 32.

A web 60 connects the yoke 56 to the bearing housing proper, wherein a pair of tapered roller bearings 61, 62 are preferably provided. A pulley shaft 63 in rotary engagement with these roller bearings 61 and 62 is provided with a nut 64, which bears against the upper roller bearing 61 and serves as a support for the shaft 63. A suitable dust cover 65 may be provided for the housing 55. The shaft 63 extends beyond the bearing housing 55 and is connected to the outer pulley 53 or 54, each of which comprises a coiled wire member, which may look like but does not operate as a spring, spokes 69 in sets of three, and a pair of aligning members 66. Aligning members 66 from a wide groove 67, and each conveyor belt 21 or 22 has a V-projection or truncated (trapezoidal) projection 68 which engages in the grooves 67, to insure proper keying of the sloping belt 21 or 22.

As will be seen, the inner pulleys 51 and 52 have narrow grooves 89 that closely engage the belt's projection 68, as close fitting guides for the belts 21 and 22. The outboard pulleys 53 and 54 have the broad grooves 67 that enable belt training and take care of belts that have ribs 68 shaped like truncated cones, as seen in cross section. For belt training, the pivot pin 57 being threaded and secured to the bolt 58, the housing 55 can be aligned relative to the frame 32 by rotating the bolt 58, and locking it by tightening a nut. The slot 59 enables this adjusting movement, and the broad grooves 67 enable the training of the belts 21 and 22 to take place on the outer pulleys 53 and 54 without doing anything at the inner pulleys 51 and 52.

The bearing housing 55 is also provided, preferably in the web 60 between the actual bearing and the yoke 56, with a slot 70 (FIG. 11), across which is provided a suiltable rotatable member 71, to which is connected one end of a spring cartridge assembly 72 (see FIGS. 5 and 6). At this end of the spring cartridge assembly 72, a threaded portion 73 extends through the internally threaded pivoting member 71. To a rod portion 75 at the end of threaded portion 71 are secured a pair of spaced apart collars 76 and 77, between which is a spring 78 and a loose pad 79. The upper collar 76 is threaded, for assembly purposes only, after which the collar 76 and rod 75 are unitized by welding. The pad 79 can be secured in matching notches 37 in the frame 33 in such a manner as to compress the spring 78, causing it to shorten so that the collar 76 is lifted off the pad 79. This compression is accomplished by rotating the cartridge 72 so that the threaded portion 73 runs through the member 71. As a result, the spring 78 exerts a force tending to swing the bearing housing 55 outwardly about the pivot pin 71, whereas the belt 21 or 22 resists this force, so that the desired tension is achieved in the belt by adjustment of the force of the spring 78.

The gear box 34 is connected with a drive system for the machine by the pulley 46 and belt 45. A shaft 80 secured to the pulley engages a universal joint 81 and leads into a gear box housing 82. The center line of the pivot pin 50 passes through the center line of the joint 81, to enable the proper relative movement. Inside the housing 82, a shaft 83 leads to a miter gear 84, which is meshed with another miter gear 85; the gear 85 transfers the drive to the pulleys 51, 52 through a gear train 86 and shafts 87 and 88. The pulleys 51, 52 have grooves 89 to engage the belt projection 68 and retain the belts 21, 22 in proper training.

The crowders 27 deserve further description. Basically, they comprise sheet metal fenders provided with a sloping angular face 90 and outer angular faces 91 and 92. The sheet metal crowder 27 is positioned by means of a pair of pivots 93 secured to the frame 32, so that the crowder 27 can be rotated about the pivots 93. The lower edge 94 of the crowder 27 is retained a short distance above the belt 21 or 22 by means of a forward extension 95 having a top flange 96 which is adapted to rest on a flange 97 of the side conveyors 28 and 29. The extension 95 is provided with adjustment means to adjust its position relative to the fender 27, viz., a pair of elongated slots 98 in the extension 95 and bolts 99 secured to a forwardly extending plate portion 100. Thus, the height of the crowder 27 can be adjusted so that its edge 94 will not touch the belt 21 or 22 but will be held low enough to transfer the desired materials (such as tomatoes) to the belts 28 and 29 instead of letting them pass off the ends of the belt 21 or 22. At the same time the small clods of dirt and other undesired material go under the fender 27 and fall off the belts 21, 22 to the ground. By lifting the fender 27, access is had to the belt 21 or 22, and lifting also enables the clearing of the belt, should any large obstructing member get caught there. The lifting is done by hand. The fender 27, being a part of the conveyor assembly 20, comes off with it and of course is therefore foolproof so far as its installation is concerned.

Thus, in the invention, the rear cross-conveyor assembly 20 is entirely supported by the frame 32, which in turn, by means of the bars 42, is supported by the main frame 44 simply through the pair of sockets 43, enabling the entire conveyor 20 to be litfed on and off with the only additional attachment or detachment being that of the belt 45 to the pulley 46. Once in place, the fenders 27 are adjusted, if that is necessary, and the machine is ready to operate. The drive connection being solely through the belt 45, the conveyors 21 and 22 are moved at speeds regulated elsewhere on the machine. The assembly 20 adjusts the tension of its belts 21 and 22 automatically by means of the swinging bearing housings 55 and springs 78, so that each belt 21, 22 is always maintained at the proper tautness, and if it appears that the spring 78 needs adjusting, this is accomplished by means of the screw 73. The open helicoid pulleys 51, 52, 53, 54 enable any dirt to work out to their lower ends and prevent any build-up on either pulleys or belt. The bearing combinations at the outer pulleys 53, 54 in conjunction with the operation of the gear box 34 assure satisfactory operation alignment of all the moving parts.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A rear cross-conveyor assembly for a tomato harvester and the like, said harvester having a frame with a pair of sockets adjacent the rear end inclined down toward the forward end, said frame supporting a centrally located fruit collecting conveyor to deliver fruit rearwardly to said rear cross-conveyor assembly, blower means for sending a strong rearward airstream from adjacent the rear end of said collecting conveyor across said rear cross-conveyor assembly, a pair of forwardly moving sorting conveyors extending along the outside at the sides of said frame, to which said rear cross-conveyor assembly delivers its fruit, and conveyor drive means including a drive belt for said rear cross-conveyor assembly, said rear cross-conveyor assembly including in combination a rigid conveyor frame having pivot means adjacent each end and conveyor-belt support means between its ends, and a pair of forwardly extending bars engageable in said sockets and comprising the sole support for said cross-conveyor assembly, said bars lying in a plane parallel to the plane of said belt-support means so that said frame is generally horizontal from end to end and slopes down from rear to front, transmission means supported centrally by said conveyor frame and having pulley means engageable with said drive belt to provide the only connection of said assembly with said harvester other than that of said bars in said sockets, a pair of inboard belt-supporting pulleys rotatably supported on fixed axes adjacent said transmission means above the central portion of said conveyor frame and driven by said transmission means, bearing means at each end of said conveyor frame, each supported by said pivot means so that each said bearing means is rotatable relative to said frame, said bearing means having a rotatable idling shaft spaced from and parallel to said pivot means, an outboard belt-supporting pulley supported by each said idling shaft, a pair of conveyor belts, each looped about one inboard pulley and one outboard pulley and tending to swing said outboard pulley and its bearing means inwardly toward the inboard pulleys, spring cartridge means between each said bearing means and said frame exerting pressure on said bearing means tending to swing said bearing means outwardly about said pivot means and thereby exert tension on said belt, and means for adjusting the pressure exerted by said spring cartridge means.

2. The rear cross-conveyor assembly of claim 1 wherein said belt-supporting pulleys comprise open-wound wire helicoids.

3. The rear cross-conveyor assembly of claim 1 wherein each said inboard belt-supporting pulley includes a narrow groove, each conveyor belt includes a projecting ridge engaged in said grooves to key said conveyor belts, and each outboard belt-supporting pulley includes a wide groove larger than said ridge enabling training of said belts.

4. The rear cross-conveyor system of claim 1 having means for moving said bearing means relative to said pivot pin to swing said bearing means horizontally for training of said conveyor belts.

5. The rear cross-conveyor assembly of claim 1 wherein at each end of said belts is a crowder pivotally supported by said conveyor frame, comprising a sheet-metal member extending diagonally across its said conveyor belt in its normal position and having a lower edge spaced above said conveyor belt to enable dirt and small clods to pass beneath said crowder and off the ends of said conveyor belt.

6. The rear cross-conveyor assembly of claim 5 for a tomato harvester having a side flange adjacent said sorting conveyors, wherein said crowder has a support flange resting on said side flange to hold said lower edge in proper position, said support flange being adjustably connected to said crowder.

7. A rear cross-conveyor assembly for a tomato harvester and the like, including in combination a rigid conveyor frame having a fore-and-aft extending pivot bearing at each end along the rear edge, a gear box in the center near the rear edge, conveyor belt support means symmetrically located between the gear box and each end and extending forward thereof and a plurality of support bars extending forwardly, a bearing housing at each end of said conveyor frame along the rear edge thereof, each having a fore-and-aft extending pivot pin rotatable in said pivot bearing so that said bearing housing is rotatable relative to said frame, said bearing housing having bearings spaced from and parallel to said pivot pin, idler shaft means supported rotatably by said bearings and extending forwardly therefrom, an outboard belt-supporting pulley supported on each said idler shaft means and extending forwardly therefrom, and having an open helical belt-support portion and a wide-grooved portion, transmission means in said gear box, a pair of inboard belt-supporting pulleys adjacent said gear box rotated about a fixed axis by said transmission means, and having an open helical belt-support portion and a grooved belt-keying portion, a pair of conveyor belts, each looped about one inboard pulley and one outboard pulley and having a keying ridge engaged in said grooved keying portions and passing through said wide-grooved portions, spring cartridge means between each said bearing housing and said frame, exerting pressure on said housing tending to swing said bearing portion outwardly about said pivot pin.

8. The assembly of claim 7 having means for adjusting the pressure exerted by said spring cartridge means.

9. The assembly of claim 7 having means for adjusting the fore-and-aft inclination of said bearing housing, for belt training.

References Cited

UNITED STATES PATENTS

| 207,626 | 9/1878 | Sargent. | |
| 2,228,977 | 1/1941 | Rogers | 209—114 XR |
| 2,584,322 | 5/1964 | May et al. | 198—127 |
| 3,149,723 | 9/1964 | Schaeffer | 209—114 |

FOREIGN PATENTS

| 725,006 | 1/1966 | Canada. |

EVON C. BLUNK, *Primary Examiner.*

R. J. HICKEY, *Assistant Examiner.*

U.S. Cl. X.R.

198—66, 202; 209—114